July 11, 1933.  S. R. LARGE  1,917,988
BEARING AND GUARD THEREFOR
Filed Feb. 4, 1932   2 Sheets-Sheet 1

INVENTOR:
SAMUEL R. LARGE,
BY
HIS ATTORNEY.

July 11, 1933.　　　S. R. LARGE　　　1,917,988
BEARING AND GUARD THEREFOR
Filed Feb. 4, 1932　　　2 Sheets-Sheet 2

INVENTOR:
SAMUEL R. LARGE,
BY
HIS ATTORNEY.

UNITED STATES PATENT OFFICE

SAMUEL R. LARGE, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING AND GUARD THEREFOR

Application filed February 4, 1932. Serial No. 590,839.

This invention relates to bearings and guards therefor and comprises all of the features of novelty herein disclosed. An object of the invention is to provide improved guards or sealing devices for closing the space between relatively rotatable members, such as the race rings of an antifriction bearing, to retain lubricant and/or to exclude foreign matter. Another object is to provide a seal or guard of simple and inexpensive form and capable of easy application to a bearing race ring.

To these ends and to improve generally upon devices of this character, the invention consists in the various matters hereinafter described and claimed.

In its broader aspects, the invention is not necessarily limited to the specific constructions selected for illustrative purposes in the accompanying drawings in which Fig. 1 is a cross section of a portion of a ball bearing having the improved guards.

Figure 1:
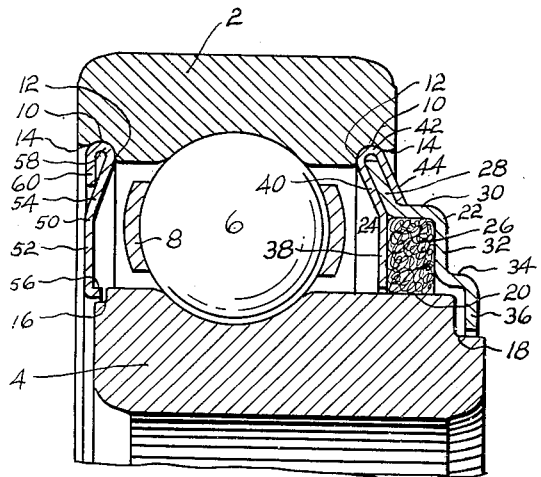

In Fig. 1, the numeral 2 indicates an outer race ring and the numeral 4 indicates an inner race ring of an antifriction bearing. Rolling elements, preferably in the form of balls 6 engaging opposed raceway grooves in the rings, carry the load and hold the rings from axial displacement, a separator or cage 8 spacing the balls. The outer race is desirably symmetrical with respect to a vertical axis through the centers of the balls and is provided on its inner wall with peripheral grooves 10 of arcuate cross section. Each groove terminates at one side in a shoulder 12, and the other side is formed by a rounded bead or land 14 which is of a diameter intermediate between the diameter of the deep part of the groove and the diameter of the inner wall of the race ring. The inner race ring is unsymmetrical, one end being somewhat overhung by the outer race ring and having an annular notch 16 about in the plane of the groove 10. The other end of the inner race ring projects beyond the corresponding end of the outer race ring and is provided with an annular notch at 18 and with a smooth peripheral surface at 20.

Figure 2:
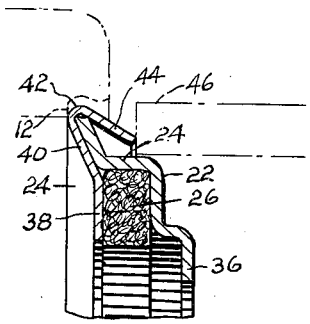
Fig. 2 is a cross section of one of the guards indicating its method of assembly with the bearing.

One end of the bearing is closed by a two-part sheet metal guard or seal comprising an outer ring or plate 22 and an inner ring or plate 24, a washer 26 of felt or the like being interposed between portions of the plates and yieldingly engaging the surface 20. The outer plate comprises a conical wall 28, a laterally projecting wall 30, a side wall 32, another laterally projecting wall 34, and a terminal wall 36 which enters the notch 18. The inner plate comprises a flat side wall 38, a conical wall 40, a bent-over arch or rounded bead 42, and a conical holding flange 44. The felt washer is confined in the groove formed by the side wall 38 and by the cupped portion comprising the walls 30 and 32. The felt is protected from grit by the cupped portion comprising the extended walls 34 and 36. The conical walls engage one another flatwise and stiffen the guard. The two seal plates are held together by a preliminary folding of the thinner of the two plates over the thicker one as indicated in Fig. 2. In this condition, the coupled plates will pass or can be made to pass inside of the land 14 so that the rounded bead 42 abuts against the shoulder 12. Thereupon, a suitable tool such as a hollow plunger 46 is pressed laterally against the end of the diverging flange 44. By pressure of the bead against the shoulder and by reaction of the flange with the outside surfaces of the walls 28 and 30, the rounded bead widens laterally and expands peripherally into the groove 10 and the seal is thus reliably attached to the outer race ring. The shoulder 12 and the wall of the groove 10 resist the angular thrust of the tool as transmitted through the flange 44 and the two conical walls 28 and 40 are stiff enough to resist any distortion of the felt chamber as the flange 44 is pressed home laterally with its edge against the wall 30. The conical walls also amplify the clearance of the seal with the separator 8 or, conversely, permit the groove 10 to be placed nearer to the ball groove and consequently permit a narrow outer race ring to be used. The conical walls stiffen the seal in assembly to such an extent that only a low thrust shoulder 12 and a shallow groove 10 are needed. The arched bead forms an inwardly open groove receiving the peripheral edge of the conical wall 28 and holding the two guard plates as a unit handling structure prior to the final bending of the flange 44.

At the other end of the bearing where the outer race ring preferably overhangs the inner race ring, a narrow guard or shield 50 may be used. The guard comprises a flat side wall 52, a conical wall 54 extending at an angle to the wall 52, an inturned stiffening flange 56, a laterally extending arch or bead 58, and a flange 60. The inturned flange 56 enters the notch 16 but has running clearance with the race ring. The guard is first pressed into the shape shown at the left of Fig. 4 and then is expanded into the groove as will later appear.

Figure 3:
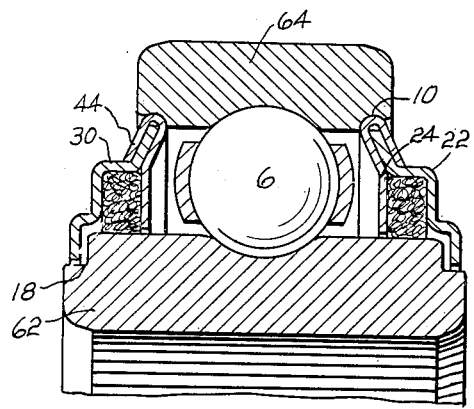
Fig. 3 is a cross section of a modification.

Fig. 3 shows a symmetrical bearing having its inner race ring 62 extended at both ends beyond the narrow outer race ring 64. Both ends of the bearing are closed by a guard or seal similar to that shown at the right of Fig. 1.

Figure 4:
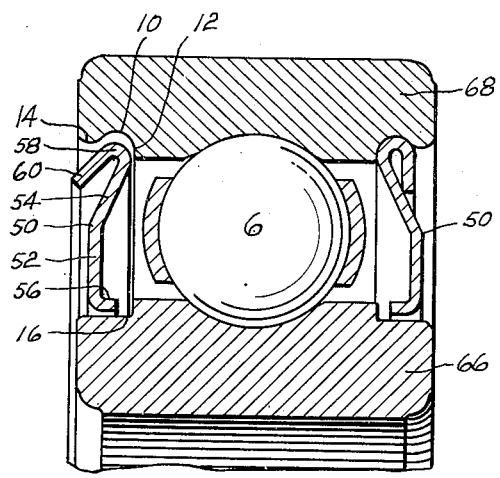
Fig. 4 is a cross section of another modification, one of the guards being shown in a preliminary condition ready for assembly with the bearing.

Fig. 4 shows a symmetrical bearing having its inner race ring 66 and its outer race ring 68 flush at both ends. Both ends of the bearing are shown closed by a guard or shield similar to that at the left of Fig. 1, one such guard being shown completely attached and the other ready for expansion into its groove.

Figure 5:
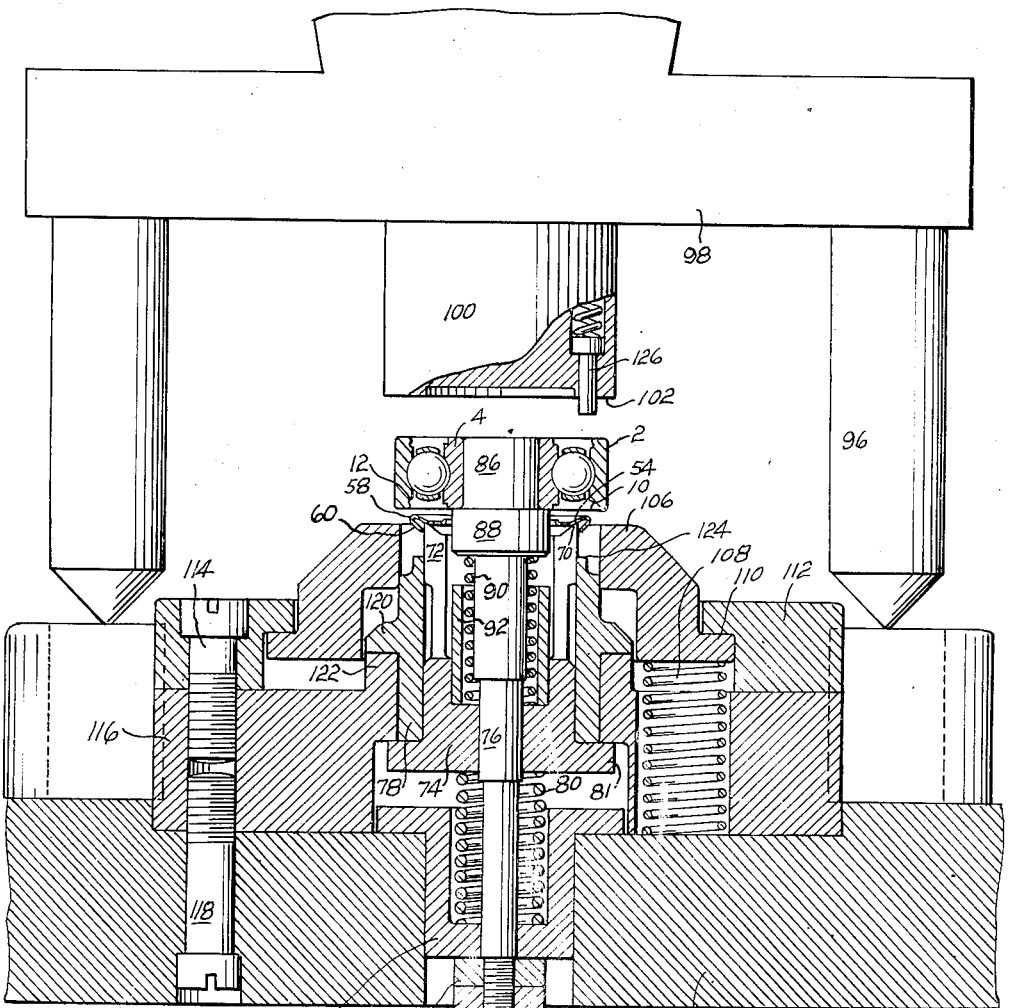
Fig. 5 is a side view, partly in section, of apparatus for attaching a guard to a bearing.
Figures 6, 7:
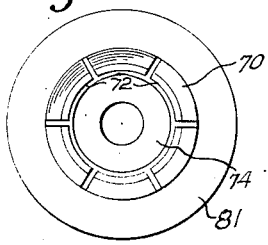
Fig. 6 is a plan view of a yieldable core.
Fig. 7 is a sectional view of parts of Fig. 5 in different positions.

Referring to Figs. 5, 6 and 7, the unexpanded guard is laid horizontally with its conical wall 54 resting on the bevelled edge 70 of a split sleeve having segments 72 carried by a plate 74 which is slidable vertically with respect to a plunger 76 and in a sleeve 78. A strong coil spring 80 presses the plate upwardly as far as a stop flange 81 permits. The spring is supported by the bottom of a flanged cup 82 which is carried by a base plate 84. The bearing is sleeved over a pilot stud 86 on the plunger 76 and rests against a collar 88, a coil spring 90, which is weaker than spring 80, tending to lift the plunger and being contained in a sleeve 92 on the plate 74. Nuts 94 on the lower end of the plunger limit its upward movement. Dowel pins 96 enter holes in the base plate to guide a cross head 98 carrying a ram 100 having an annular surface 102 adapted to engage the upper face of the outer race ring 2. When the ram descends, the spring 90 yields first and the bearing is moved downwardly until the shoulder 12 engages the arch or rounded bead 58 of the guard which may be made of a diameter to snap past the land 14. The outer race ring 2 then engages an annular plate 106 which is urged upwardly by coil springs 108. Upward movement is limited by a stop flange 110 engaging a mating flange on a ring 112 secured by screws 114 to a plate 116 which is in turn fastened by screws 118 to the base plate. Downward movement is limited by the annular plate engaging a collar 120 on the sleeve 78, the collar resting on a flange 122 of the plate 116. An annular surface 124 on the upper end of the unyielding sleeve 78 is met by the diverging flange 60 of the guard as the guard and bearing descend together with the plunger 76, split sleeve 72 and plate 106. Upward pressure upon the flange 60 completes the fold and expands the rounded bead into the groove, the outer surface of the split sleeve 72 centering the guard and aiding in the expansion in a manner similar to the wall 24 of Fig. 2. The split sleeve is capable of giving a little laterally to compensate for out of round in the groove 10 after heat treatment, thus tending to avoid any distortion of the outer race ring when pressing in the guard. A spring-pressed stripper pin 126 prevents the bearing from sticking to the ram when the latter rises.

In all forms, the bead extends laterally from the conical wall towards the plane of the flat side wall and the bendable flange extends back in spaced relation to the conical wall. At the left of Fig. 1 and in Fig. 4 the flange meets the conical wall. In Fig. 4 the flange is parallel to the side wall 54 and at the left of Fig. 1 it is also substantially in the plane of the side wall. The guards can of course be omitted from one or both sides of any of the illustrated bearings. When used without seals or guards, the bearing nevertheless presents a finished appearance because the rounded land 14 resembles the usual chamfer and merges smoothly with the groove 10 by a sinuous bend. Hence such bearings may be built as standard products for use with or without guards and a bearing so sold without guards can always be supplied with them later. Also a standard form of outer race ring can be made for assembly with a variety of inner race rings. Although the tapering walls 28, 40 and 54 are preferably conical, this is not essential as a strong construction to resist deflection can be obtained by making these walls conform to other surfaces of revolution.

I claim:

1. In a unit-handling sealing device, a two-part guard comprising a pair of plates having walls spaced apart to form a groove, the plates also having tapering walls engaging one another, and one of the plates having a portion bent to form an inwardly open groove receiving the peripheral edge of the other plate; substantially as described.

2. In a unit-handling sealing device, a two-part guard comprising a pair of plates, one of the plates having a cupped portion, the other plate having its inner portion forming a groove with the cupped portion, the plates having tapering walls joined to said portions and engaging flatwise against one another, and a rounded bead on one of the tapering walls bent around and enclosing the peripheral edge of the other tapering wall; substantially as described.

3. In a unit-handling sealing device, a two-part guard comprising a pair of rings, the rings having their inner portions spaced apart laterally to form a groove, the rings having tapering walls joined to said inner portions, and one of the rings having its outer portion bent to form a groove receiving the tapering wall of the other ring; substantially as described.

4. In a unit-handling sealing device, a two-part guard comprising a pair of rings having tapering walls engaging one another, one of the rings having a cupped portion extending laterally from the tapering wall, and the other ring having a portion bent around the periphery of the last said tapering wall and extending to the outer surface of said laterally extending wall; substantially as described.

5. In a unit-handling sealing device, a two-part guard comprising a pair of rings, one of the rings having its intermediate portion cupped and joined to a tapering wall, the inner portion of said ring having another cupped portion extending inwardly and laterally beyond the first cupped portion, the other ring having a wall opposite to the first cupped portion to make a groove therewith, said other ring also having a tapering wall engaging flatwise against the first tapering wall, and means for securing said tapering walls together; substantially as described.

6. In a unit-handling sealing device, a pair of rings one of which has a straight wall and a wall extending laterally therefrom, the other ring having a straight wall engaging flatwise against the other straight wall, the other ring also having a portion bent around the periphery of the straight wall of the one ring with a flange extending along said straight wall into contact with the laterally extending wall; substantially as described.

7. In a guard for bearings and the like, a ring having a tapering wall and an outwardly rounded bead, the periphery of said tapering wall being connected to the outwardly rounded bead, and a bendable flange for expanding the bead, the flange being connected to the rounded bead and extending back in spaced relation to the outer surface of the tapering wall; substantially as described.

8. In a guard for bearings and the like, a ring having a straight side wall, a tapering wall connected to and extending at an angle to the side wall, a rounded bead connected to the periphery of the tapering wall and extending outwardly towards the plane of the straight side wall, and a flange connected to the rounded bead and extending back in spaced relation to the tapering wall; substantially as described.

9. In a guard for bearings and the like, a ring having a flat side wall, a tapering wall extending at an angle to the side wall, a rounded bead connected to the tapering wall and arching laterally towards the plane of the side wall, and a flange connected to the rounded bead and extending back parallel to the side wall and at an angle to the tapering wall; substantially as described.

10. In a guard for bearings and the like, a ring having a flat side wall, a laterally bent flange at one periphery of the side wall, a tapering wall extending at an angle from the other periphery of the side wall, a rounded bead connected to the periphery of the tapering wall and extending towards the plane of the side wall, and a flange connected to the rounded bead and extending back in spaced relation to the tapering wall and contacting at its edge with the tapering wall; substantially as described.

11. In a guard for bearings and the like, a ring having a flat side wall and a tapering wall extending at an angle thereto, a rounded bead connected to the periphery of the tapering wall and extending back towards the plane of the side wall, and a flange connected to the rounded bead, the flange extending in diverging relation to the tapering wall whereby lateral bending towards said tapering wall will expand the rounded bead; substantially as described.

12. In a unit-handling antifriction bearing and guard, an inner race ring, an outer race ring, a series of rolling elements, one of the race rings having a rounded groove terminating in a shoulder, a guard ring having a stiff body wall, a rounded bead connected to the periphery of the body wall and arching laterally towards the outside surface of the body wall, a flange connected to the rounded bead and extending back along the body wall, the rounded bead engaging the shoulder, and the flange being exposed at the outer side of the body wall for lateral bending against it to expand the rounded bead into holding engagement with the rounded groove; substantially as described.

13. In a unit-handling antifriction bearing and guard, an inner race ring, an outer race ring, a series of rolling elements, one of said rings having a groove terminating in a shoulder and a land outside of the groove, a guard comprising a tapering wall, a rounded bead connected to the tapering wall and having a diameter to pass the land and engage the shoulder, the rounded bead arching laterally from the shoulder towards the land, and a flange connected to the rounded bead and bendable towards the tapering wall to expand the bead into the groove; substantially as described.

14. In a unit-handling autifriction bearing and guard, an inner race ring, an outer race ring, a series of rolling elements, one of the race rings having a groove adjacent to one edge, the other race ring having an annular notch at the corresponding edge, a guard ring comprising a flat side wall, a tapering wall extending at an angle thereto, a flange bent laterally from the side wall to enter the annular notch, a rounded bead connected to the tapering wall and arching laterally towards the plane of the side wall, and a flange connected to the rounded bead and extending back outside of the tapering wall and parallel to the side wall; substantially as described.

In testimony whereof I hereunto affix my signature.

SAMUEL R. LARGE.